United States Patent
Manadhata et al.

(10) Patent No.: US 11,310,247 B2
(45) Date of Patent: Apr. 19, 2022

(54) ABNORMAL BEHAVIOR DETECTION OF ENTERPRISE ENTITIES USING TIME-SERIES DATA

(71) Applicant: Hewlett Packard Enterprise Development LP, Houston, TX (US)

(72) Inventors: Pratyusa K Manadhata, Princeton, NJ (US); Sandeep N Bhatt, Princeton, NJ (US); Tomas Sander, Princeton, NJ (US)

(73) Assignee: Micro Focus LLC, Santa Clara, CA (US)

( * ) Notice: Subject to any disclaimer, the term of this patent is extended or adjusted under 35 U.S.C. 154(b) by 1179 days.

(21) Appl. No.: 15/386,101

(22) Filed: Dec. 21, 2016

(65) Prior Publication Data
US 2018/0176241 A1    Jun. 21, 2018

(51) Int. Cl.
H04L 29/06    (2006.01)
H04L 29/08    (2006.01)
(Continued)

(52) U.S. Cl.
CPC ...... H04L 63/1425 (2013.01); G06F 16/2477 (2019.01); G06N 5/022 (2013.01);
(Continued)

(58) Field of Classification Search
CPC . H04L 63/1425; H04L 61/1511; H04L 67/02; H04L 67/10; H04L 67/306; G06F 17/30551; G06N 5/022; G06N 99/005
See application file for complete search history.

(56) References Cited

U.S. PATENT DOCUMENTS 7,640,460 B2 * 12/2009 Bahl ................ H04L 41/0681
  714/47.2
8,260,914 B1 *  9/2012 Ranjan ............. H04L 61/1511
  709/224
(Continued)

FOREIGN PATENT DOCUMENTS

WO    WO-2016/020660 A1    2/2016

OTHER PUBLICATIONS

Bilge et al ("Bilge," Exposure: A Passive DNS Analysis to Detect and Report Malicious Domains, ACM Transactions on Information and System Security, vol. 16, No. 4, Article 14, Publication Date: Apr. 2014, pp. 14:1-14:28).*
(Continued)

Primary Examiner — Luu T Pham
Assistant Examiner — James J Wilcox

(57) ABSTRACT

A machine-readable medium may store instructions executable by a processing resource to access log data of an enterprise and extract time-series data of an enterprise entity from the log data. The time-series data may include measured feature values of a set of selected features over a series of time periods. The instructions may be further executable to train a predictive model specific to the enterprise entity using the time-series data, wherein the predictive model is to generate, for a particular time period, a predicted feature value for each of the selected features; access actual feature values of the enterprise entity for the particular time period; apply first-level deviation criteria to the actual feature value and the predicted feature value of each selected feature to identify deviant features of the enterprise entity; and apply second-level deviation criteria to the identified deviant features to identify the enterprise entity as behaving abnormally.

20 Claims, 7 Drawing Sheets

(51) Int. Cl.
    *H04L 29/12*      (2006.01)
    *G06N 5/02*       (2006.01)
    *G06N 20/00*      (2019.01)
    *G06F 16/2458*    (2019.01)
    *H04L 67/02*      (2022.01)
    *H04L 61/4511*    (2022.01)
    *H04L 67/306*     (2022.01)
    *H04L 67/10*      (2022.01)

(52) U.S. Cl.
    CPC .......... *G06N 20/00* (2019.01); *H04L 61/1511* (2013.01); *H04L 67/02* (2013.01); *H04L 67/10* (2013.01); *H04L 67/306* (2013.01)

(56) References Cited

U.S. PATENT DOCUMENTS

| | | | |
|---|---|---|---|
| 8,539,577 B1* | 9/2013 | Stewart | H04L 29/12066 726/22 |
| 9,106,700 B2 | 8/2015 | Archbold | |
| 9,154,516 B1* | 10/2015 | Vaystikh | H04L 63/1425 |
| 9,166,995 B1* | 10/2015 | Roundy | H04L 63/1425 |
| 9,306,969 B2 | 4/2016 | Dagon et al. | |
| 9,378,361 B1* | 6/2016 | Yen | G06F 21/55 |
| 9,516,053 B1* | 12/2016 | Muddu | G06F 16/254 |
| 9,690,933 B1* | 6/2017 | Singh | G06N 5/025 |
| 9,838,407 B1* | 12/2017 | Oprea | H04L 63/1416 |
| 10,511,498 B1* | 12/2019 | Narayan | H04L 63/1416 |
| 2012/0246730 A1* | 9/2012 | Raad | H04L 61/1552 726/25 |
| 2014/0108640 A1* | 4/2014 | Mathis | H04L 63/1425 709/224 |
| 2014/0280698 A1* | 9/2014 | Lahti | G06F 21/53 709/217 |
| 2015/0106926 A1* | 4/2015 | Basavapatna | G06F 21/552 726/22 |
| 2015/0180893 A1* | 6/2015 | Im | H04L 63/1425 726/23 |
| 2015/0334129 A1* | 11/2015 | Moyle | H04L 63/20 726/1 |
| 2015/0381648 A1* | 12/2015 | Mathis | H04L 63/1425 726/22 |
| 2016/0028599 A1* | 1/2016 | Vasseur | H04L 41/16 370/252 |
| 2016/0057162 A1* | 2/2016 | Merza | G06F 21/552 726/23 |
| 2016/0088006 A1* | 3/2016 | Gupta | H04L 43/08 726/23 |
| 2016/0103724 A1* | 4/2016 | Kim | G06F 11/0751 714/37 |
| 2016/0164721 A1* | 6/2016 | Zhang | H04L 41/142 709/224 |
| 2016/0255109 A1* | 9/2016 | Koyanagi | H04L 63/1416 726/23 |
| 2016/0261616 A1* | 9/2016 | Shulman | H04L 63/0272 |
| 2016/0269431 A1 | 9/2016 | Singla | |
| 2016/0294773 A1 | 10/2016 | Yu et al. | |
| 2016/0308725 A1* | 10/2016 | Tang | H04L 63/1425 |
| 2016/0328654 A1* | 11/2016 | Bauer | G06K 9/6267 |
| 2016/0373477 A1* | 12/2016 | Moyle | H04L 63/1425 |
| 2017/0048265 A1* | 2/2017 | Merza | H04L 63/1416 |
| 2017/0063886 A1* | 3/2017 | Muddu | H04L 43/00 |
| 2017/0063888 A1* | 3/2017 | Muddu | G06F 3/0484 |
| 2017/0063889 A1* | 3/2017 | Muddu | H04L 41/145 |
| 2017/0063890 A1* | 3/2017 | Muddu | G06F 16/24578 |
| 2017/0063891 A1* | 3/2017 | Muddu | G06F 40/134 |
| 2017/0063894 A1* | 3/2017 | Muddu | G06F 3/0484 |
| 2017/0063896 A1* | 3/2017 | Muddu | G06N 7/005 |
| 2017/0063899 A1* | 3/2017 | Muddu | G06F 3/0484 |
| 2017/0063905 A1* | 3/2017 | Muddu | H04L 41/22 |
| 2017/0093907 A1* | 3/2017 | Srivastava | H04L 63/1458 |
| 2017/0195090 A1* | 7/2017 | Boidol | H04W 4/70 |
| 2017/0201542 A1* | 7/2017 | Kim | H04L 63/1425 |
| 2017/0289184 A1* | 10/2017 | C | H04L 67/12 |
| 2017/0318032 A1* | 11/2017 | Hoffmann | H04L 63/1416 |
| 2018/0077175 A1* | 3/2018 | DiValentin | G06F 16/254 |
| 2018/0124091 A1* | 5/2018 | Sweeney | G06F 16/2228 |
| 2018/0159877 A1* | 6/2018 | Holzhauer | H04L 43/08 |
| 2019/0098043 A1* | 3/2019 | Banerjee | H04L 63/1425 |
| 2019/0124099 A1* | 4/2019 | Matselyukh | G06F 21/566 |

OTHER PUBLICATIONS

Cisco (Introduction to Cisco IOS NetFlow Whitepaper, May 2012, pp. 1-16).*

Kang et al "Detecting and Predicting of Abnormal Behavior Using Hierarchical Markov Model in Smart Home Network," pp. 410-414, IEEE (Year: 2010).*

Andrii Shalaginov et al., "Malware Beaconing Detection by Mining Large-scale DNS Logs for Targeted Attack Identification," 2016, pp. 701-713, International Scholarly and Scientific Research & Innovation, vol. 10, No. 4.

Hongyuan Cui et al., "Data Mining-Based DNS Log Analysis," Dec. 2014, pp. 311-323, Annals of Data Science, vol. 1, Issue 3, Springer-Verlag Berlin Heidelberg.

Jonghoon Kwon et al., "PsyBoG: A Scalable Botnet Detection Method for Large-Scale DNS Traffic," Jan. 12, 2016, pp. 48-73, Computer Networks 97, Elsevier B.V.

Snyder, M. et al., "Preprocessing DNS Log Data for Effective Data Mining", Research Paper, Aug. 8, 2014, pp. 1-5.

* cited by examiner

ABNORMAL BEHAVIOR DETECTION OF ENTERPRISE ENTITIES USING TIME-SERIES DATA

BACKGROUND

With rapid advances in technology, computing systems are used in virtually all aspects of society today. Computing systems and devices are increasing in complexity and processing capability, and may be used in various industries and contexts. Enterprises (e.g., organizations, corporations, campuses, business entities, etc.) may utilize information technology (IT) systems with hundreds of thousands of devices and user accounts, and in some cases more. Increases in the efficiency, capability, and security of computing systems will result in further widespread use and adoption of technology.

BRIEF DESCRIPTION OF THE DRAWINGS

Certain examples are described in the following detailed description and in reference to the drawings.

DETAILED DESCRIPTION

Examples consistent with the present disclosure may support detection of abnormal behavior among entities of an enterprise. An enterprise may refer to a logical or physical organization that acts as a single entity. Example enterprises include businesses, corporations, non-profit organizations, commercial establishments, academic institutions, government entities, and more. Enterprise entities may refer to any individual entity that is part of the enterprise, and may thus include users, personnel, equipment, devices, user accounts, and more. The features described herein may support use of time-series data to detect enterprise entities (e.g., enterprise devices and user accounts) exhibiting abnormal behavior, which may indicate device compromises, installed malware, presence of security threats, and the like.

Through analysis of time-series data of an individual enterprise entity, a baseline standard of behavior can be established and future behavior may be predicted. Deviation from such predicted behavior may indicate abnormal behavior, particularly when multiple different characteristics, aspects, or other features of the enterprise entity simultaneously deviate. Thus, through use of time-series data, abnormal behavior may be detected without predefined baseline behavior. As such, the features described herein may support detection of continually changing malware and security threats. As also described in greater detail herein, application of various deviation criteria to categorize deviant behavior may result in increased system security, accuracy, and efficiency, e.g., by reducing false-positives (e.g., benign behavior identified as malicious behavior thereby increasing the workload of security analysts), flexibly adapting to changing malware attack patterns, detecting active malware that was previously dormant, etc. Further example security capabilities are described in greater detail in turn.

Figure 1:
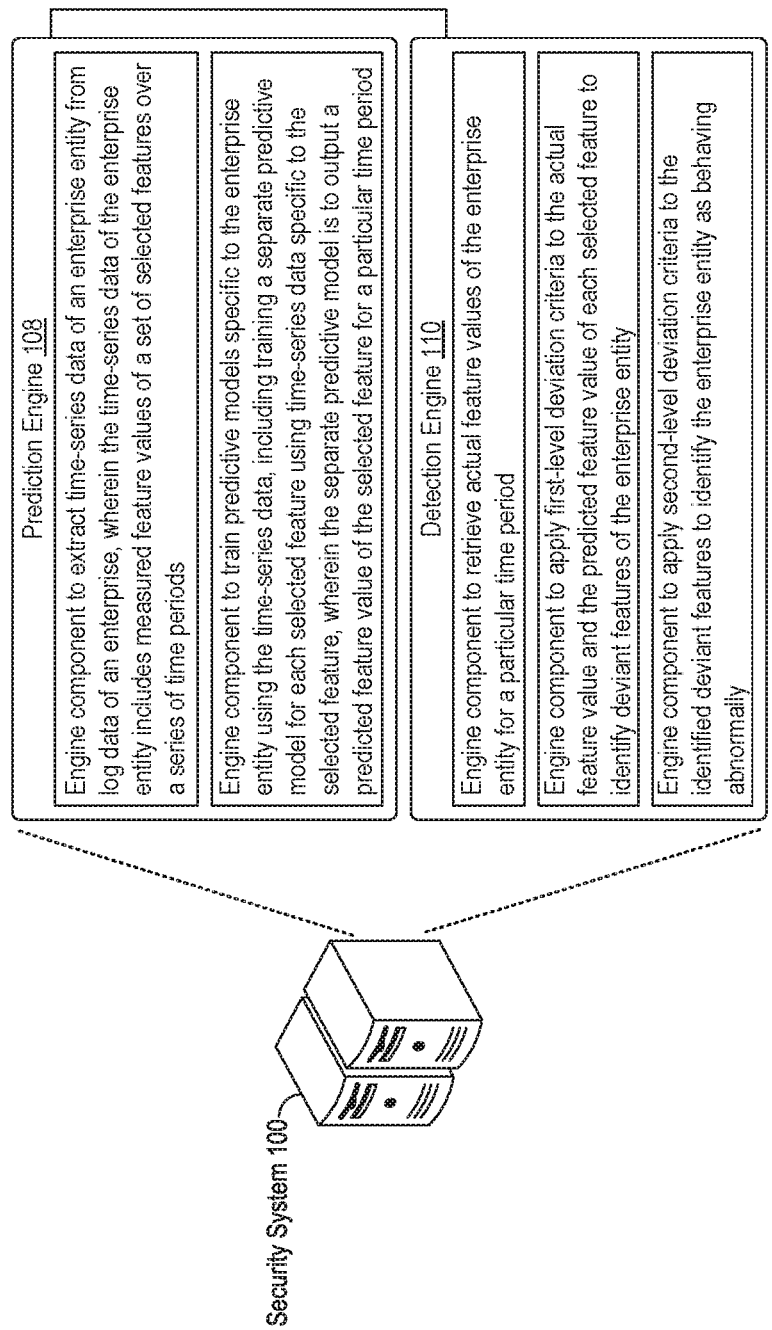
FIG. 1 shows an example of a security system that supports detection of abnormal behavior of enterprise entities using time-series data.

FIG. 1 shows an example of a security system 100 that supports detection of abnormal behavior of enterprise entities using time-series data. The security system 100 may take the form of any computing system, and may thus include a single or multiple computing devices such as servers, compute nodes, desktop or laptop computers, smart phones or other mobile devices, tablet devices, embedded controllers, and more.

The security system 100 may implement or provide any number of security capabilities to an enterprise. For example, the security system 100 may implement a security information and event management (SIEM) system that supports identification, analysis, and management of security issues that affect an enterprise. As described in greater below, the security system 100 may support identification of enterprise entities that behave abnormally, perhaps indicative of a compromised entity exploited by malware, other security vulnerabilities, hacker attacks, and the like.

To identify enterprise entities behaving abnormally, the security system 100 may extract time-series data of enterprise entities. The security system 100 may analyze extracted time-series data in order to determine baseline behavior and predict subsequent behavior in line with established baselines. Predictive models may be utilized to analyze the time-series data and output predicted values for enterprise entities. In particular, the security system 100 may utilize time-series data and predictive models for specifically selected features. As used herein, features of an enterprise entity may refer to any measurable characteristic, value, or attribute of the enterprise entity. Further, the security system 100 may apply any number of deviation criteria to identify features of enterprise entities that deviate from predicted values, and further identify abnormal behavior based on deviation criteria applied to features identified as deviant.

The security system 100 may include various elements to provide or support any of the abnormal behavior detection capabilities described herein. In the example shown in FIG. 1, the security system 100 includes a prediction engine 108 and a detection engine 110. The security system 100 may implement the prediction engine 108 and detection engine 110 (including components thereof) in various ways, for example as hardware and programming. The programming for the prediction engine 108 and detection engine 110 may take the form of processor-executable instructions stored on a non-transitory machine-readable storage medium, and the processor-executable instructions may, upon execution, cause hardware to perform any of the security aspects described herein. In that regard, various programming instructions of the prediction engine 108 and detection engine 110 may implement engine components to support or provide the security capabilities described herein.

The hardware for the prediction engine 108 and detection engine 110 may include a processing resource to execute programming instructions. A processing resource may include various number of processors with a single or multiple processing cores, and a processing resource may be implemented through a single-processor or multi-processor architecture. In some examples, the security system 100 implements multiple engines (or other logic) using the same system features or hardware components, e.g., a common processing resource).

The prediction engine 108 and detection engine 110 may implement any combination of the abnormal behavior detection capabilities described herein, and different instances of the prediction engine 108 and detection engine 110 may thus vary in terms of implementation, functionality, and capability. As shown in the illustrative example of FIG. 1, the prediction engine 108 may include engine components to extract time-series data of an enterprise entity from log data of an enterprise, wherein the time-series data of the enterprise entity includes measured feature values of a set of selected features over a series of time periods; and train predictive models specific to the enterprise entity using the time-series data, including training a separate predictive model for each selected feature using time-series data specific to the selected feature, wherein the separate predictive model is to output a predicted feature value of the selected feature for a particular time period.

As also shown in the illustrative example of FIG. 1, the detection engine 110 may include engine components to retrieve actual feature values of the enterprise entity for the particular time period; apply first-level deviation criteria to the actual feature value and the predicted feature value of each selected feature to identify deviant features of the enterprise entity; and apply second-level deviation criteria to the identified deviant features to identify the enterprise entity as behaving abnormally These and other aspects of various abnormal behavior detection capabilities disclosed herein are described in greater detail next.

Figure 2:
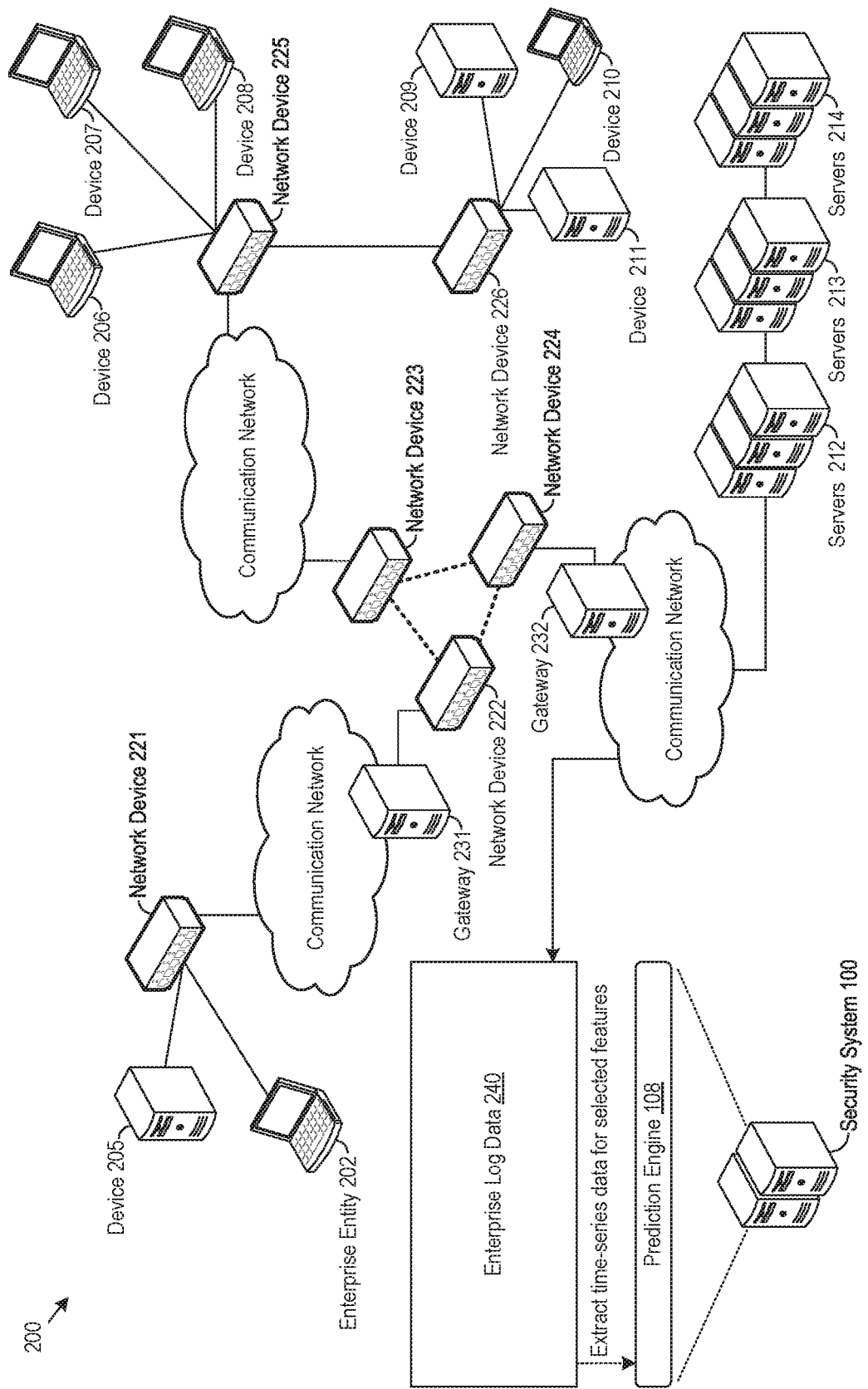
FIG. 2 shows an example of an enterprise system that includes a security system to detect abnormal behavior of enterprise entities.

FIG. 2 shows an example of an enterprise system 200 that includes a security system 100 to detect abnormal behavior of enterprise entities. The enterprise system 200 may include any device associated with an enterprise, and may thus include user devices (e.g., laptops, desktops, smartphones, table devices, and the like), any type of server (e.g., application servers, web servers, e-mail exchange servers, print servers, database servers, and much more), network devices (e.g., gateways, routers, switches, hubs, etc.), and more. Enterprise devices may be interlinked by any number of communication networks. In the illustrative example shown in FIG. 2, the enterprise system 200 includes the enterprise entity 202 (e.g., a user laptop) as well as enterprise devices 205-211, servers 212-214, network devices 221-226, and gateways 231-232.

The enterprise system 200 may include a security system 100. The security system 100 may monitor any number of enterprise entities, such as the enterprise devices (e.g., 202, 205-211, 212-214, 221-226, and 231-232) or associated enterprise user accounts. In operation, the security system 100 may monitor enterprise entities for security anomalies and detect when the enterprise entities behave abnormally. As part of such a process, the security system 100 may identify and categorize behavior of enterprise entities, and in doing so, the security system 100 may extract time-series data for any number of enterprise entities.

To extract time-series data, the security system 100 may include a prediction engine 108 to obtain enterprise log data 240. The enterprise log data 240 may include any type of information related to any enterprise entity of the enterprise system 200. As such, the prediction engine 108 may collect enterprise log data 240 from various sources, such as domain name system (DNS) logs from DNS servers, hypertext transfer protocol (HTTP) proxy logs from proxy servers or other network devices, netflow logs from routers, event logs, performance logs directly from enterprise devices, firewall data, virtual private network (VPN) logs, and more. In some examples, the prediction engine 108 itself collects the enterprise log data 240 from various sources, e.g., on a periodic or on-demand basis. In other examples, the prediction engine 108 may access the enterprise log data 240 from a centralized storage location, e.g., as periodically or otherwise aggregated by other logic of the security system 100 or enterprise system 200.

From the enterprise log data 240, the prediction engine 108 may extract time-series data. Time-series data may refer to data characteristics of enterprise entities measured over multiple time periods. The specific time period duration or length at which the prediction engine 108 extracts time-series data may be configurable, and some examples of applicable time period durations include a 1-hour time period, a 4-hour time period, an 8-day time period, a 1-day time period, or any other specified time period duration. As such, the prediction engine 108 may extract time-series data from the enterprise log data 240 for multiple enterprise entities monitored by the security system 100, and in some examples do so on a per-entity basis. That is, the prediction engine 108 may extract separate time-series data for each monitored enterprise entity of the enterprise system 200.

In some implementations, the prediction engine 108 may extract time-series data from the enterprise log data 240 at a feature-specific granularity. In such cases, the prediction engine 108 may extract separate time-series data for each feature from a set of a selected features applicable to a particular enterprise entity. As illustrative examples, some features of an enterprise entity measurable per time period include a number of DNS queries by the enterprise entity, a percentage of DNS queries to blacklisted domains (e.g., known malicious domains) by the enterprise entity, a number of distinct domains queried by the enterprise entity, number of distinct domains queried by the enterprise entity, a percentage of distinct domains queried by the enterprise entity that are blacklisted domains, and a highest number of distinct queries to an individual blacklisted domain by the enterprise entity. Many more feature examples are presented below.

The specific makeup of the set of selected features from which the prediction engine 108 extracts time-series data may be configurable, for example by a system administrator or other security system user. The makeup of the selected features may include particular features that are susceptible to effect or change when an entity is compromised by malware, hacking, or other security threats. The set of selected features for which the prediction engine 108 extracts time-series data may be configurable through any number of operational parameters of the security system 100. For instance, a parameter or configuration file maintained by the security system 100 may specify selected enterprise entity features to extract time-series data for.

Figure 3:
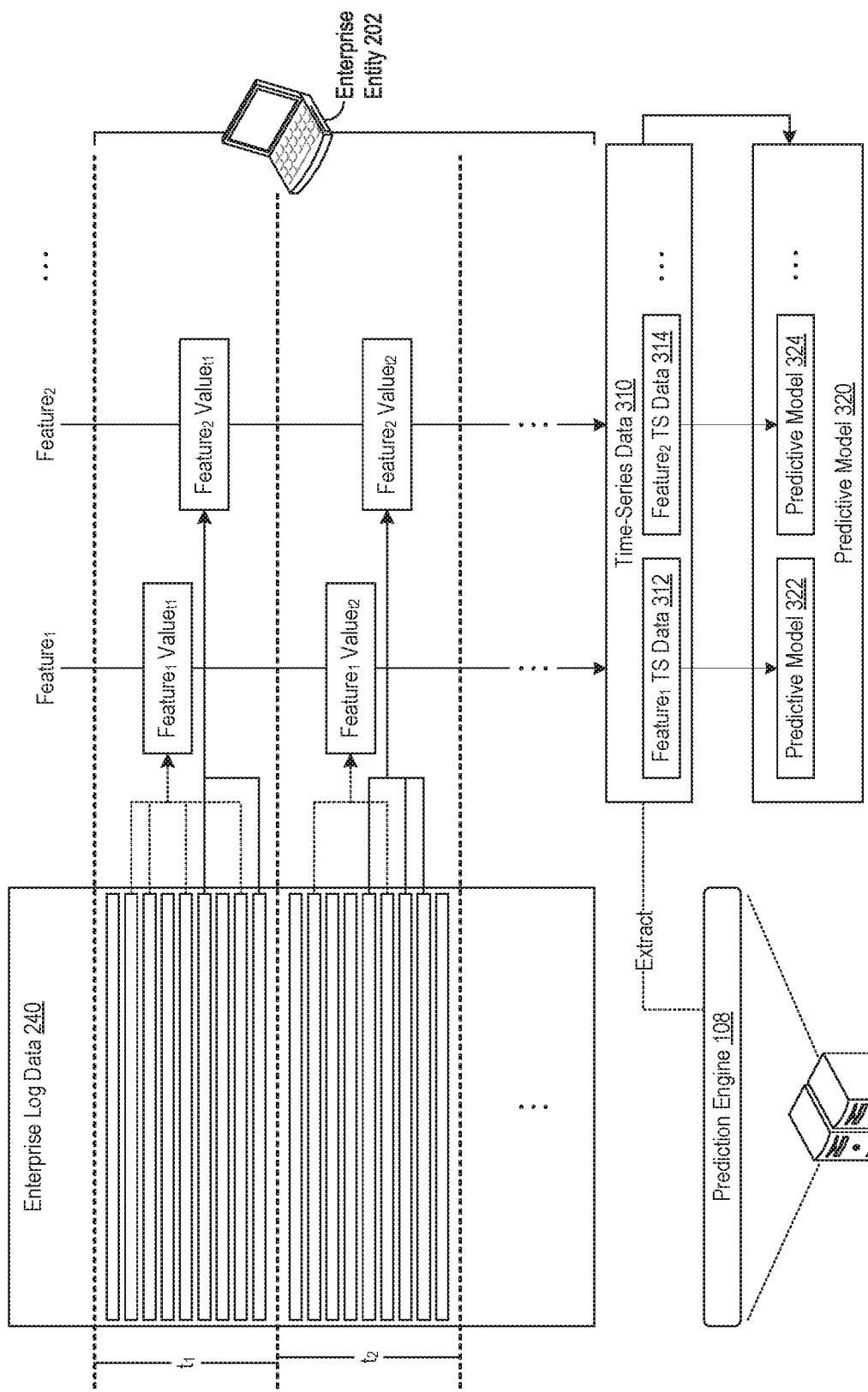
FIG. 3 shows an example of time-series data extraction that a security system may perform.

An illustrative example of time-series data extraction for various selected features is presented next through FIG. 3 with respect to enterprise entity 202.

FIG. 3 shows an example of time-series data extraction that a security system 100 may perform. In FIG. 3, a prediction engine 108 of the security system 100 extracts the time-series data 310 from the enterprise log data 240 obtained for an enterprise system 200. The example time-series data 310 shown in FIG. 3 corresponds specifically to enterprise entity 202 of the enterprise system 200, and the prediction engine 108 may similarly extract time-series data for other enterprise entities as well.

To extract the time-series data 310 from the enterprise log data 240, the prediction engine 108 may parse the enterprise log data 240 to identify, calculate, or otherwise measure feature values of the enterprise entity 202. As the time-series data 310 may include features values of the enterprise entity 202 for multiple time periods, the prediction engine 108 may parse a sufficient portion of the enterprise log data 240 to extract time-series data 310 for the multiple time periods. To illustrate, the enterprise log data 240 may include enterprise data for a total of a 1-year period and the prediction engine 108 may extract feature values from the enterprise log data 240 in incremental 4-hour time periods (that is, the duration of each time-period is 4-hours). In this illustration accordingly, the time period $t_1$ shown in FIG. 3 may refer to a particular time period from 12:00 am-3:59:59 am on January 1, the time period $t_2$ shown in FIG. 3 may refer to a particular time period from 4:00 am-7:59:59 am on January 1, and so forth for other time periods in the overall 1-year period.

For some or all of the 4-hour time periods included in enterprise log data 240 (or time periods of any other configurable duration), the prediction engine 108 may determine a corresponding feature value for each selected feature. In FIG. 3, the prediction engine 108 determines values for example features shown as "Feature$_1$" and "Feature$_2$", and does so for multiple different time periods with respect to the enterprise log data 240. For time period $t_1$, the prediction engine 108 may parse the enterprise log data 240 to measure, extract, or compute a feature value for Feature$_1$ specific to enterprise entity 202.

As an example, Feature$_1$ may measure a number of DNS queries performed by the enterprise entity 202. The prediction engine 108 may parse the enterprise log data 240 to count the number of DNS queries by the enterprise entity 202 during time period $t_1$ (e.g., illustrated as the measured feature value shown as "Feature$_1$ Value$_{t1}$" in FIG. 1), during time period t2 (illustrated as "Feature$_1$ Value$_{t2}$"), and so forth. These measured feature values of Feature$_1$ may collectively form time-series data specific to Feature$_1$ for the enterprise entity 202, shown in FIG. 1 as Feature$_1$ time-series data 312. In a consistent manner, the prediction engine 108 may extract time-series data specific to various other features for the enterprise entity 202, such as the Feature$_2$ time-series data 314 shown in FIG. 3 for Feature$_2$.

The prediction engine 108 may thus extract time-series data 310 of the enterprise entity 202, which may include measured feature values of a set of selected features over a series of consecutive time periods. As noted above, the specific number and type of features for which the prediction engine 108 extracts time-series data may vary. Some examples of selected features that the prediction engine 108 may extract time-series data for a presented next.

As one example, the prediction engine 108 may extract time-series data specific to DNS-related features measured for the enterprise entity 202. Table 1 lists example DNS query features for which the prediction engine 108 may measure features values from various time periods in enterprise log data 240. A domain or an IP address may be characterized as blacklisted if the domain or the IP address is known to be malicious, as whitelisted if it is known to be benign, and as graylisted if it is neither blacklisted nor whitelisted.

TABLE 1

Example DNS Query Features
DNS Query Features

Number of DNS queries
Percentage of DNS queries to blacklisted or graylisted domains
Number of distinct domains queried
Percentage of the distinct domains queried that are blacklisted or graylisted
Total number of NULL type queries to blacklisted, whitelisted, or graylisted domains
Highest number of distinct queries made to an individual blacklisted or graylisted domain
Number of domains queried for the first time by the enterprise entity
Number of domains queried for the first time by any enterprise entity
Number of newly registered domains queried by the enterprise entity
Number of queries to new top-level domains
Minimum, maximum, and average length of DNS queries
Minimum, maximum, and average number of distinct subdomains queried per second-level domain
Number of bursts: Number of time windows of a preconfigured duration in which the enterprise entity performed a number of DNS queries that exceeds a burst threshold Table 2 lists example DNS response features for which the prediction engine 108 may measure features values from various time periods in enterprise log data 240.

TABLE 2

Example DNS Response Features
DNS Response Features

Number of non-existent domain (NXDOMAIN) responses for queries to blacklisted or graylisted domains
Percentage of new top level domain queries that result in NXDOMAIN responses
Number of canonical name (CNAME) records with blacklisted domains
Number of distinct domains in CNAME records
Number of A records with a blacklisted Internet Protocol (IP) address or an IP address mapped to a suspicious autonomous system number (ASN) listing
Number of NS records with a blacklisted IP address or an IP address mapped to a suspicious ASN listing
A maximum count of distinct text (TXT) records over all requested domains
Number of queried DNS domains for which a response is missing
Number of DNS requests that were forwarded to an external authoritative NS As another example, the prediction engine 108 may extract time-series data specific to HTTP-related features measured for the enterprise entity 202. Table 3 lists example HTTP features for which the prediction engine 108 may measure features values from various time periods in enterprise log data 240.

TABLE 3

Example HTTP Features
HTTP Features

Total number of HTTP requests
Number of connections by type (HTTP, TCP, etc.)
Number of HTTP connections by category
Number of connection bursts
Number of bytes sent and received
Number of files downloaded
Number of distinct domains in uniform resource locators (URLs) of the HTTP requests
Percentage of HTTP requests to blacklisted or graylisted domains
Percentage of HTTP requests to blacklisted or graylisted IP addresses
Count of HTTP requests to access selected file types (e.g., .exe, .pdf, .jpeg, .zip, .xlsx, .jar, or more)
Count of HTTP requests to blacklisted domains or blacklisted IP addresses to access the selected file types

TABLE 3-continued

Example HTTP Features
HTTP Features

Count of HTTP requests to access blacklisted filenames
Count of user-agents
Count of user-agents that have never been used by the enterprise entity
Count of user-agents that have never been used by any enterprise entity
Number of connections to blacklisted or graylisted domains with data transfer amounts exceeding a large transfer threshold
Count of domains requested for the first time
Count of domains requested for the first time by any enterprise entity
Count of HTTP requests to new top-level-domains
Count of HTTP requests that were blocked
Count of requested domains that were blocked
Count of requests to IP addresses that were blocked
Count of requests to IP addresses mapped to a suspicious ASN listing
Count of malformed requests
Count of HTTP requests where the referrer field is a blacklisted domain, graylisted domain, or empty
Count of HTTP requests to a new domain where the referrer field is a blacklisted domain, graylisted domain, or empty
Count of HTTP requests to IP addresses contacted by less than a threshold number of enterprise entities
Count of requests to domains contacted by less than a threshold number of enterprise entities
Use of an application protocol not previously used by the enterprise entity
Use of a connection port not previously used by the enterprise entity
Minimum, maximum, and average length of requested URLs
Number of 404 errors returned
Number of HTTP requests that resulted in an error (e.g., as noted in an HTTP proxy log)

As yet another example, the prediction engine 108 may extract time-series data specific to Netflow-related features measured for the enterprise entity 202. Table 4 lists example Netflow features for which the prediction engine 108 may measure features values from various time periods in enterprise log data 240.

TABLE 4

Example Netflow Features
Netflow Features

Total number of connections
Number of connection bursts
Percentage of connections to blacklisted or graylisted IP addresses
Number of connections to an external IP over port 53 (e.g., not from an internal DNS server)
Number of HTTP connections to an external IP (e.g., not from a proxy server)
Number of failed connection attempts
Number of failed secure socket shell (SSH) connections
Number of ports on which connection attempts were made to a target IP address
Number of connection attempts to distinct IP addresses
Ratio of successful connections to failed connections that exceeds an abnormality threshold
Number of connections to external storage sites, domains, or IP addresses
Number of bytes transferred to an external IP address
Communication over a port categorized as "unexpected" according to a "expected port use" listing of or based on infrequency of use
Rate of connections
Rate of incoming data
Number of connections made at times when the enterprise entity is usually inactive (e.g., outside of normal business hours or as determined according to prior usage history)
Regular or periodic connections from the enterprise entity to an external IP address
Number of incoming connections from internal IP addresses
Number of incoming connections from external IP addresses
Number of bytes successfully transferred to the enterprise entity by internal IP addresses
Number of bytes successfully transferred to the enterprise entity by external IP addresses

TABLE 4-continued

Example Netflow Features
Netflow Features

Number of distinct IP addresses (internal or external) that made successful connections to the enterprise entity
Number of distinct IP addresses (internal or external) with unsuccessful connections to the enterprise entity Some example DNS, HTTP, and NETFLOW features are listed above. The prediction engine 108 may extract time-series data for any combination of the example features listed above as well as various additional or alternative features. Other types of features may be selected, such as firewall data, VPN data, performance log data, and more. The specific set of selected features for which the prediction engine 108 extracts time-series data may be controlled through a configuration file or through any other mechanism by which operational parameters of the security system 100 are specified.

Upon extracting time-series data 310 from the enterprise log data 240 for the enterprise entity 202, the prediction engine 108 may train a predictive model using the extracted time-series data 310. A predictive model may utilize any modeling logic or technique to generate predicted feature values for the enterprise entity 202 at subsequent time periods (e.g., that have yet to occur). As such, the time-series data 310 may serve as training data or training samples through which predictive models may establish baseline or standard behavior of enterprise entities and predict subsequent feature values that are in-line with the provided time-series data.

In FIG. 3, the prediction engine 108 provides the time-series data 310 to a predictive model 320. Although illustrated separately, the security system 100 itself may implement the predictive model 320, for example as part of the prediction engine 108. The predictive model 320 may process the time-series data 310 according any number of predictive algorithms, machine-learning techniques, and analytic logic. As examples, the predictive model 320 may utilize an Autoregression Integrated Moving Average (ARIMA) model or any other regression model, random forests, discrete choice models, neural networks, support vector machines, and more. In doing so, the prediction engine 108 may support prediction of subsequent feature values for enterprise entities using extracted time-series data.

In some examples, the predictive model 320 may include individual models for each selected feature for which time-series data was extracted by the prediction engine 108. To illustrate, the predictive model 320 shown in FIG. 3 may include multiple individual models, such as the predictive model 322 specific to $Feature_1$ trained using the $Feature_1$ time-series data 312, the predictive model 324 specific to $Feature_2$ trained using the $Feature_2$ time-series data 314, and other predictive models for other features. In that regard, the prediction engine 108 may train separate predictive models for each monitored enterprise entity (e.g., at a per entity granularity), and further train individual predictive models for each selected feature from which time-series data extractions are performed (e.g., at a per-entity-per-feature granularity).

To illustrate, the prediction engine 108 may train twenty (20) individual predictive models for a particular enterprise entity. Each of the twenty individual predictive models may specifically correlate with one of twenty (20) selected features monitored by the security system 100 for the particular enterprise entity, e.g., a separate predictive model for each selected feature. Each separate predictive model may output predicted feature values for a specific feature. For instance, the predictive model 322 in FIG. 3 may output predicted feature values of $Feature_1$ for the enterprise entity 202, the predictive model 324 may output predicted feature values of $Feature_2$ for the enterprise entity 202, and so on. Moreover, the predictive models 320, 322, or 324 may generate predicted feature values based on actual feature values measured for the enterprise entity 202, examples of which are described next with respect to FIG. 4.

Figure 4:
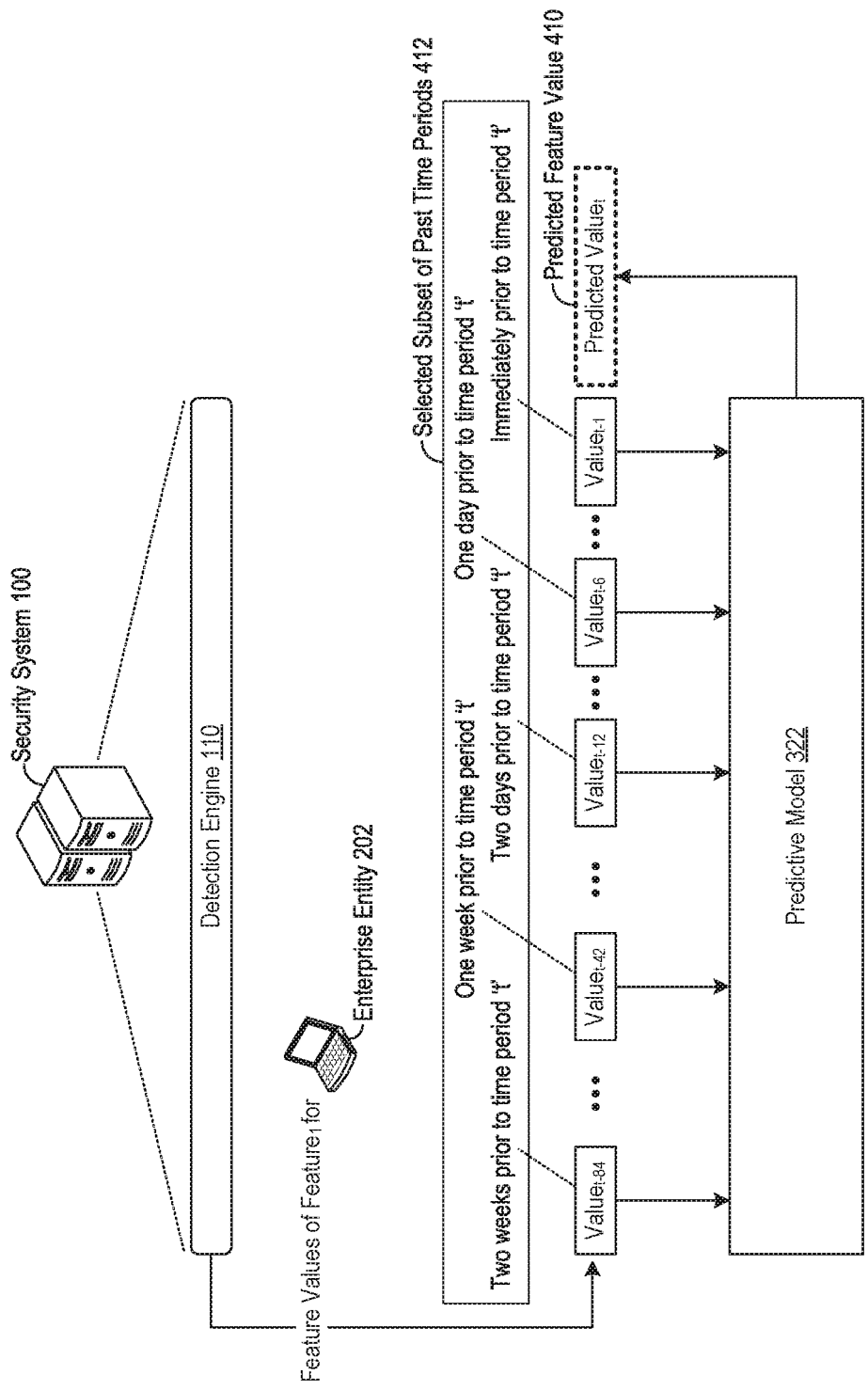
FIG. 4 shows an example of feature values that a security system may provide to a predictive model to generate a predicted feature value for an enterprise entity.

FIG. 4 shows an example of feature values that a security system 100 may provide to a predictive model to generate a predicted feature value for an enterprise entity. In FIG. 4, the security system 100 implements a detection engine 110 and may further implement the predictive model 322 trained with time-series data extracted for a particular feature (e.g., $Feature_1$) of an enterprise entity (e.g., enterprise entity 202). The predictive model 322 may output predicted feature values of $Feature_1$ for the enterprise entity 202.

In operation, the predictive model 322 may output a predicted feature value at any specified time period. Example time periods include subsequent or future time periods for which an actual feature value may be unknown, past time periods in which actual feature value may be known, or a current time period in which actual feature values may be concurrently measured. The predictive model 322 may generate a predicted feature value based on a selected subset of actual feature values from past time periods. In FIG. 4, the predictive model 322 generates a predicted feature value 410 of $Feature_1$ for the enterprise entity 202 and for a particular time period denoted as t. The detection engine 110 may provide, as inputs into the predictive model 322 to generate the predicted feature value 410, actual feature values of the enterprise entity 202 from a selected subset of past time periods 412 prior to the particular time period t. In that regard, the predictive model 322 may model, generate, or output a predicted feature value based on a specific subset of actual feature values from past time periods. The selected subset of past time periods 412 applied by the security system 100 may be configurable, and may be selected based on seasonalities of time that have been determined to significantly impact the feature value of a particular time period.

Some examples of seasonalities and actual feature values from past time periods are shown in FIG. 4. In the particular example shown in FIG. 4, the detection engine 110 may select past time periods based on daily and weekly seasonalities. For the particular time period t, the detection engine 110 may provide actual feature values of $Feature_1$ for the enterprise entity 202 from one day and two days prior to the particular time period t (daily seasonality) as well as actual feature values from one week and two weeks prior to the particular time period t (weekly seasonality). As another example of a selected past time period, the detection engine 110 may provide the predictive model 322 with an actual feature value of $Feature_1$ for the enterprise entity 202 from the time period immediately prior to the particular time period t.

In the illustrative example shown in FIG. 4, the security system 100 may extract data and determine feature values for time periods with a 4-hour duration. Thus with respect to the time period t, the immediately prior time period may be identified as t−1, the time period from one day prior may be identified as t−6, the time period from two days prior may be identified as t−12, the time period from one week prior may be identified as t−42, and the time period from two weeks prior may be identified as t−84. The detection engine 110 may access the actual feature values measured for the selected subset of past time periods 412 and provide the actual feature values to the predictive model 322 to generate the predicted feature value 410. As such, predictive models may output predicted feature values for enterprise entities generated based on past actual feature values of the enterprise entities.

FIG. 4 provides but one example of a selected subset of past time periods by which a predictive model may generate a predicted feature value. Other combinations of actual feature values from other past time periods may be similarly provided or accessed. Also, FIG. 4 shows one example in which the detection engine 110 provides actual feature values to the predictive model 322. In other implementations, the predictive model 322 or the prediction engine 108 may access the actual feature values. For instance, the security system 100 may regularly or periodically update predictive models, providing additional extracted time-series data to analyze. Such additional extracted time-series data may include some or all of the actual feature values included in the selected subset of past time periods 412, by which the predictive model 322 access actual feature values to generate the predicted feature value 410.

A security system 100 may compare predicted feature values with actual-measured feature values to assess behavior of an enterprise entity. In doing so, the security system 100 may apply deviation criteria to determine whether enterprise entities are behaving abnormally.

Figure 5:
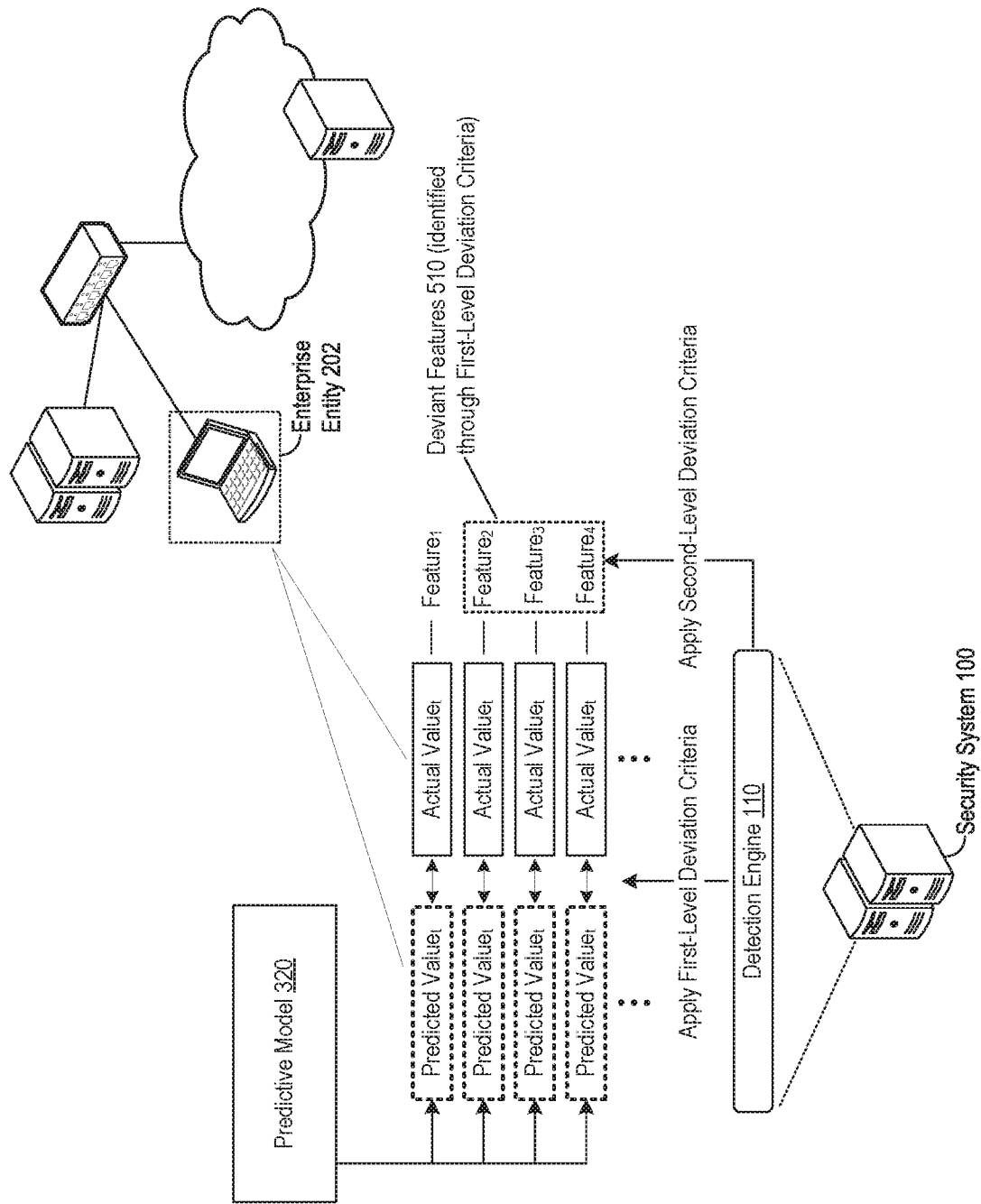
FIG. 5 shows an example of deviation criteria application by a security system to identify an enterprise entity as behaving abnormally.

FIG. 5 shows an example of deviation criteria application by a security system 100 to identify an enterprise entity as behaving abnormally. In FIG. 5, the security system 100 includes a detection engine 110 which may apply deviation criteria for the enterprise entity 202 to assess whether the enterprise entity 202 is behaving abnormally. In doing so, the detection engine 110 may apply multiple levels or tiers of deviation criteria, for example first-level deviation criteria applied to individual features and second-level deviation criteria applied to deviant features identified through the first-level deviation criteria. These levels of deviation criteria are described in turn.

The detection engine 110 may apply first-level deviation criteria to compare predicted feature values with actual feature values. In doing so, the detection engine 110 may identify deviant features as predicted feature value-actual feature value pairs that satisfy the first-level deviation criteria. In that regard, first-level deviation criteria may identify deviant features and indicate when a particular feature of the enterprise entity 202 deviates from predicted or baseline behavior output by the predictive model 320.

The detection engine 110 may apply first-level deviation criteria on a per-feature basis. For each predicted feature value output by the predictive model 320 for the enterprise entity 202 specific to a particular time period t, the detection engine 110 may access a corresponding actual feature value measured for the particular time period t and apply the first-level deviation criteria. The first-level deviation criteria may be satisfied when, for example, the actual feature value exceeds or falls below the predicted feature value. To illustrate, the predictive model 320 may predict that the enterprise entity 202 will send a count of 23 DNS queries during a particular time period t. Responsive to determining the actual count of DNS queries sent by the enterprise entity 202 during the particular time period t is 55, the detection engine 110 may determine that such a "DNS query count" feature satisfies the first-level deviation criteria and identify this feature as a deviant feature.

In some implementations, the predicted value output by the predictive model 320 may take the form of a percentile range for multiple possible values of a selected feature. In these implementations, the detection engine 110 may apply the first-level deviation criteria to an actual feature and a predicted feature value of a particular selected feature, and do so to identify the particular selected feature as a deviant feature when the actual feature value of the particular selected feature exceeds the predicted feature of a threshold percentile in the percentile range of predicted values for the particular selected feature (e.g., exceeds the $99^{th}$ percentile value generated by the predictive model 320). To illustrate, the $99^{th}$ percentile value generated by predictive model 320 for the "DNS query count" feature for the particular time period t may be 50. Responsive to determining the actual count of DNS queries sent by the enterprise entity 202 during the particular time period t is 55, the detection engine 110 may determine that such a "DNS query count" feature exceeds the $99^{th}$ percentile value, thus satisfying the first-level deviation criteria. In such cases, the detection engine 110 may determine the "DNS query count" feature of the enterprise entity 202 as a deviant feature. First-level deviation criteria for falling below a threshold value or threshold percentile value may be similarly applied by the detection engine.

The detection engine 110 may apply first-level deviation criteria on a per-feature basis. As such, the detection engine 110 may apply different first-level criteria to different selected features, which may allow for flexibility in how different features are treated. For instance, the detection engine 110 may apply different threshold percentiles to different selected features. Percentile thresholds may be configured to vary for features characterized as higher priority or with higher impact caused by entity compromise (e.g., lower percentile thresholds) as compared to normal or lower priority features (higher percentile thresholds). Such configuration of the detection engine 110 may be effectuated through operational parameters of the security system 100, e.g., by a system administrator or other user.

Through applying first-level deviation criteria to predicted feature value-actual feature value pairs, the detection engine 110 may identify specific features of the enterprise entity 202 exhibiting abnormal behavior. Features that satisfy first-level deviation criteria may be characterized as deviant features of the enterprise entity 202, such as the deviant features 510 identified by the detection engine 110 in FIG. 5. The detection engine 110 may apply second-level deviation criteria to the deviant features 510 to determine whether the enterprise entity 202 itself is behaving abnormally.

As one example, the detection engine 110 may determine that deviant features 510 satisfy second-level deviation criteria when the number of deviant features exceeds a threshold. For instance, the detection engine 110 may determine the enterprise entity 202 satisfies second-level deviation criteria when more than 10 of the selected features or identified as deviant in a particular time period t. Along similar lines, another example of second level criteria that the detection engine 110 may apply is whether a ratio of deviant features to total selected features exceeds a percentage threshold (e.g., more than 75% of selected features are identified as deviant in the particular time period t). These examples of second-level deviation criteria may reduce false-positives in abnormal behavior detection. A single anomalous or deviant feature of the enterprise entity 202 may be innocuous. However, multiple features are simultaneously deviant may indicate behavior of the enterprise entity 202 is suspicious enough to warrant further investigation. As such, the detection engine 110 may determine the enterprise entity 202 as behaving abnormally when the deviant features identified for the enterprise entity 202 satisfy second-level deviation criteria.

As yet another example of second-level deviation criteria, the detection engine 110 may determine whether a specific combination of the selected features are identified as deviant. Specific combinations of features that are simultaneously deviant may be indicative a compromised entity. In such cases, the detection engine 110 may apply second-level deviation criteria to monitor specific preconfigured combinations of features. Additionally or alternatively, the detection engine 110 may apply second-level deviation criteria that is satisfied when a particular feature is identified as deviant over multiple time periods, e.g., a threshold number of consecutive time periods, a threshold percentage over a rolling window of time periods, and the like.

Through application of deviation criteria, the detection engine 110 may determine whether to categorize the enterprise entity 202 as behaving abnormally with respect to a particular time period t. In a consistent manner, the detection engine 110 may monitor other enterprise entities as well, detecting abnormal behavior through deviation criteria. While some examples of first-level and second-level deviation criteria are described above, the detection engine 110 may apply other consistent or similar criteria. Combinations of various deviation criteria are contemplated as well.

Figure 6:
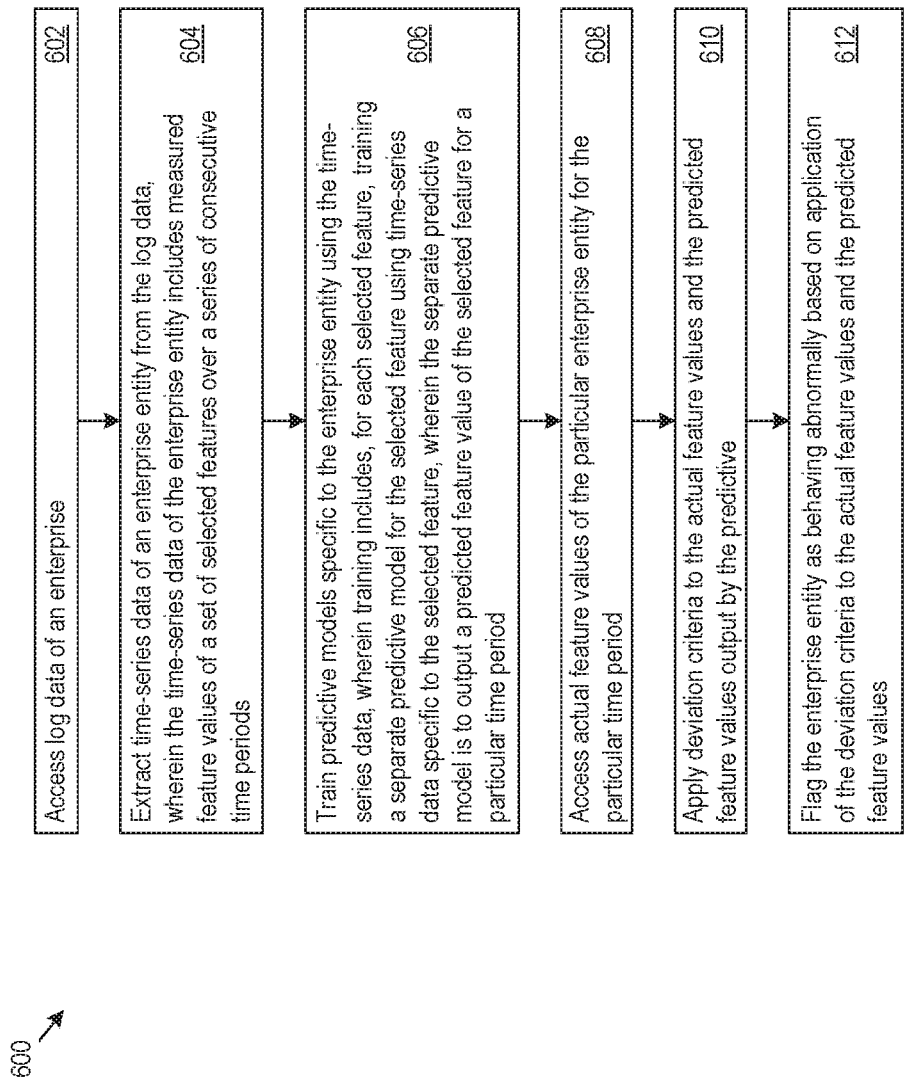
FIG. 6 shows a flow chart of an example method to detect abnormal behavior of enterprise entities using time-series data.

FIG. 6 shows a flow chart of an example method 600 to detect abnormal behavior of enterprise entities using time-series data. Execution of the method 600 is described with reference to the security system 100, and particularly the prediction engine 108 and detection engine 110. However, any other device, hardware-programming combination, or other suitable computing system may implement or execute any of the steps of the method 600. As examples, the method 600 may be implemented in the form of executable instructions stored on a machine-readable storage medium or in the form of electronic circuitry.

In implementing or performing the method 600, the prediction engine 108 may access log data of an enterprise (602) and extract time-series data of an enterprise entity from the log data (604). The time-series data extracted by the prediction engine 108 may include measured feature values of a set of selected features over a series of consecutive time periods, and the set of selected features may be configurable and preselected. The prediction engine 108 may further train predictive models specific to the enterprise entity using the time-series data (606). Training may include, for each feature value, training a separate predictive model for the selected feature using time-series data specific to the selected feature and each separate predictive model may output a predicted feature value of the selected feature for a particular time period.

In implementing or performing the method 600, the detection engine 110 may access actual feature values of the enterprise entity for the particular time period (608) and apply deviation criteria to the actual feature values and the predicted feature values output by the predictive models (610). The detection engine 110 may access actual feature values from enterprise log data, e.g., by computing or measuring the feature values through parsing and analysis of the log data. The detection engine 110 may flag the enterprise entity as behaving abnormally based on application of the deviation criteria to the actual feature values and the predicted feature values (612).

In applying deviation criteria to the actual feature values and the predicted feature values, the detection engine 110 may apply first-level deviation criteria to the actual feature value and the predicted feature value of each selected feature to identify deviant features of the enterprise entity and apply second-level deviation criteria to the identified deviant features to identify the enterprise entity as behaving abnormally. The detection engine 110 may apply any combination of the example first-level and second-level deviation criteria described herein.

For instance, the predicted feature values output by the predictive models may specify a percentile range of predicted values for each of the selected features. In such cases, the detection engine 110 may apply the first-level deviation criteria to the actual feature and the predicted feature value of a particular selected feature to include identifying the particular selected feature as a deviant feature when the actual feature value of the particular selected feature exceeds the predicted feature of a threshold percentile in the percentile range of predicted values for the particular selected feature. Also, the detection engine 110 may apply different threshold percentiles to different selected features.

With regards to second-level deviation criteria, the detection engine 110 may identify the enterprise entity as behaving abnormally when a threshold number of the selected features are identified as deviant features (e.g., more than 20 features identified as deviant). Second-level deviation criteria based on threshold percentages may be used as well, (e.g., more than 50% of the selected features identified as deviant). As another example, application of the second-level deviation criteria by the detection engine 110 may include identifying the enterprise entity as behaving abnormally when a predetermined combination of the selected features are identified as deviant features.

In some implementations, the detection engine 110 may provide inputs to trained predictive models to output predicted feature values. The detection engine 110 may thus provide, as inputs into the predictive model to generate the predicted values for the selected features, actual feature values of the enterprise entity from a selected subset of past time periods prior to the particular time period. The actual feature values from the selected subset of past time periods may include, for example, an actual feature value from a time period immediately prior to the particular time period, an actual feature value from one day prior to the particular time period, an actual feature value from two days prior to the particular time period, an actual feature value from one week prior to the particular time period, and an actual feature value from two weeks prior to the particular time period. Other combinations of past time periods are possible as well.

Although one example was shown in FIG. 6, the steps of the method 600 may be ordered in various ways. Likewise, the method 600 may include any number of additional or alternative steps that a security system 100 may implement through the prediction engine 108, detection engine 110, or other components.

Figure 7:
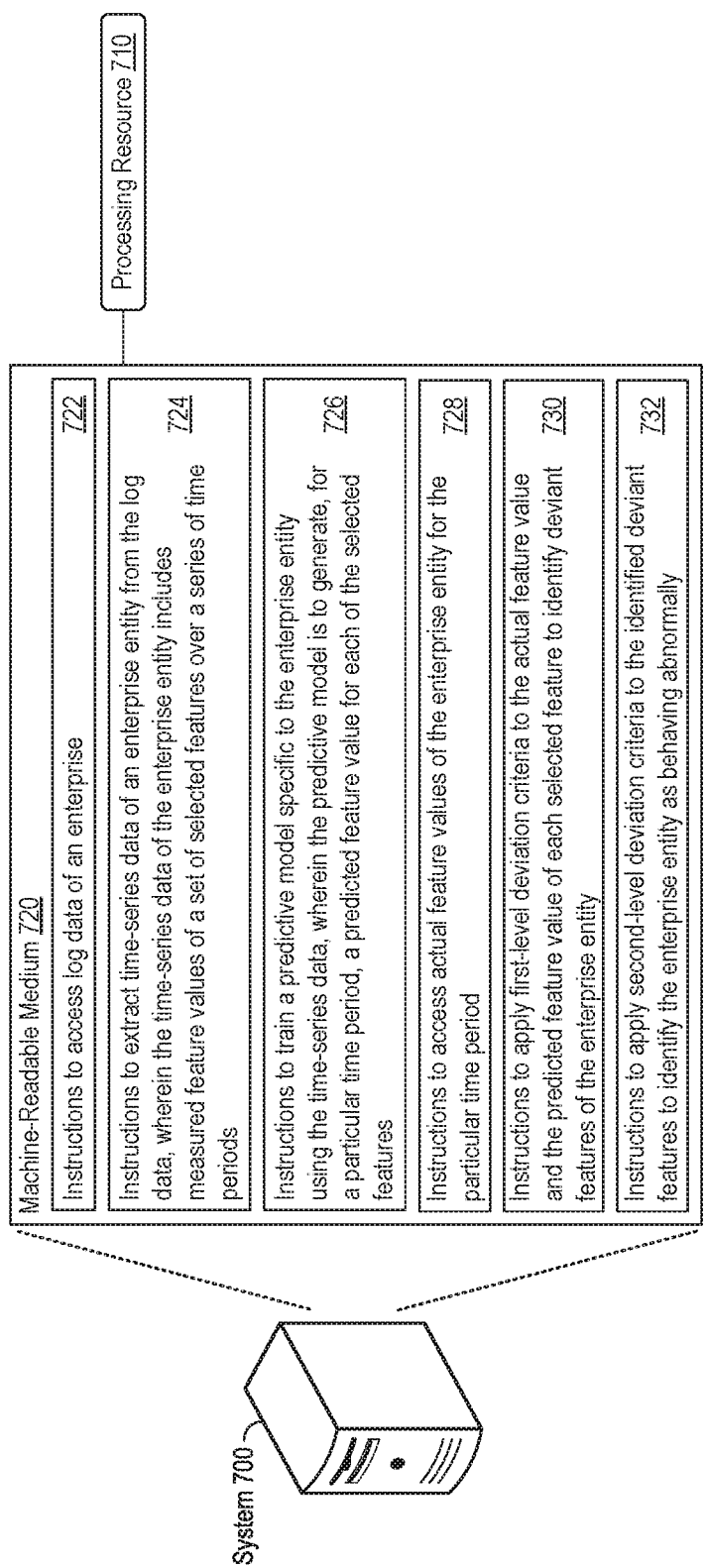
FIG. 7 shows an example of a system that supports detection of abnormal behavior of enterprise entities using time-series data.

FIG. 7 shows an example of a system 700 that supports detection of abnormal behavior of enterprise entities using time-series data. The system 700 may include a processing resource 710, which may take the form of a single or multiple processors. The processor(s) may include a central processing unit (CPU), microprocessor, or any hardware device suitable for executing instructions stored on a machine-readable medium, such as the machine-readable medium 720 shown in FIG. 7. The machine-readable medium 720 may be any non-transitory electronic, magnetic, optical, or other physical storage device that stores executable instructions, such as the instructions 722, 724, 726, 728, 730, and 732 shown in FIG. 7. As such, the machine-readable medium 720 may be, for example, Random Access Memory (RAM) such as dynamic RAM (DRAM), flash memory, memristor memory, spin-transfer torque memory, an Electrically-Erasable Programmable Read-Only Memory (EEPROM), a storage drive, an optical disk, and the like.

The system 700 may execute instructions stored on the machine-readable medium 720 through the processing resource 710. Executing the instructions may cause the system 700 to perform any of the abnormal behavior detection capabilities described herein, including according to any aspect or capability of the security system 100, prediction engine 108, or detection engine 110 as described above.

For example, execution of the instructions 722 and 724 by the processing resource 710 may cause the system 700 to access log data of an enterprise (instructions 722) and extract time-series data of an enterprise entity from the log data (instructions 724). The extracted time-series data of the enterprise entity may include measured feature values of a set of selected features over a series of time periods. Execution of the instructions 726, 728, 730, and 732 by the processing resource 710 may cause the system 700 to train a predictive model specific to the enterprise entity using the time-series data, wherein the predictive model is to generate, for a particular time period, a predicted feature value for each of the selected features (instructions 726); access actual feature values of the enterprise entity for the particular time period (instructions 728); apply first-level deviation criteria to the actual feature value and the predicted feature value of each selected feature to identify deviant features of the enterprise entity (instructions 730); and apply second-level deviation criteria to the identified deviant features to identify the enterprise entity as behaving abnormally (instructions 732).

In some examples, the instructions 732 are executable by the processing resource 170 to apply the second-level deviation criteria to identify of the enterprise entity as behaving abnormally when a threshold number of the selected features are identified as deviant features. In some examples, the machine-readable medium 720 may further include instructions executable by the processing resource 710 to provide, as inputs into the predictive model to generate the predicted values for the selected features, actual feature values of the enterprise entity from a selected subset of past time periods prior to the particular time period. The actual feature values from the selected subset of past time periods may include an actual feature value from a time period immediately prior to the particular time period, an actual feature value from one day prior to the particular time period, an actual feature value from two days prior to the particular time period, an actual feature value from one week prior to the particular time period, and an actual feature value from two weeks prior to the particular time period.

The systems, methods, devices, engines, and logic described above, including the security system 100, the prediction engine 108, and the detection engine 110, may be implemented in many different ways in many different combinations of hardware, logic, circuitry, and executable instructions stored on a machine-readable medium. For example, the prediction engine 108, the detection engine 110, or both, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any described capability of the security system 100, prediction engine 108, detection engine 110, or combinations thereof.

The processing capability of the systems, devices, and engines described herein, including the security system 100, prediction engine 108, and detection engine 110, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A system comprising:
a processor; and
a non-transitory storage medium storing instructions executable on the processor to:
extract time-series data of an enterprise entity from log data of an enterprise, wherein the time-series data includes measured feature values of a plurality of features over a series of time periods;
train predictive models for the enterprise entity using the time-series data, including training a separate predictive model for each respective feature of the plurality of features using time-series data specific to the respective feature, wherein the separate predictive model is to output a predicted feature value of the respective feature for a time period;
generate, by the trained predictive models, predicted feature values of the plurality of features in response to actual feature values of the plurality of features for the enterprise entity input to the trained predictive models;
apply first-level deviation criteria to the actual feature values input to the trained predictive models and the predicted feature values of the plurality of features to identify deviant features of the plurality of features for the enterprise entity; and
apply second-level deviation criteria to the identified deviant features to identify the enterprise entity as behaving abnormally.

2. The system of claim 1, wherein the time-series data comprises domain name service (DNS) log data, and wherein the plurality of features comprises:
a number of DNS queries from the enterprise entity, a percentage of DNS queries to blacklisted domains from the enterprise entity, a number of distinct domains queried by the enterprise entity, a percentage of distinct domains queried by the enterprise entity that are blacklisted domains, and a highest number of distinct queries to an individual blacklisted domain from the enterprise entity.

3. The system of claim 1, wherein the time-series data comprises hypertext transfer protocol (HTTP) log data, and wherein the plurality of features comprises:
a total number of HTTP requests from the enterprise entity, a number of distinct domains in uniform resource locators (URLs) of the HTTP requests from the enterprise entity, a percentage of HTTP requests to blacklisted domains or blacklisted internet protocol (IP) addresses from the enterprise entity, a count of HTTP requests to access selected file types from the enterprise entity wherein the selected file types include executable files and image files, and a count of HTTP requests to blacklisted domains or blacklisted IP addresses to access the selected file types from the enterprise entity.

4. The system of claim 1, wherein the time-series data comprises netflow log data, and wherein the plurality of features comprises:
a total number of connections by the enterprise entity, a number of connection bursts by the enterprise entity, a number of ports on which connection attempts were made to a target internet protocol (IP) address, and a number of failed connection attempts.

5. The system of claim 1, wherein the instructions are executable on the processor to apply the first-level deviation criteria to a first actual feature value and a first predicted feature value of a particular feature of the plurality of features to identify the particular feature as a deviant feature in response to the first actual feature value exceeding the first predicted feature value by a threshold.

6. The system of claim 5, wherein the instructions are executable on the processor to apply different thresholds to different features to identify deviant features.

7. The system of claim 1, wherein the instructions are executable on the processor to apply the second-level deviation criteria to identify of the enterprise entity as behaving abnormally in response to a threshold number of the plurality of features being identified as deviant features.

8. The system of claim 1, wherein the enterprise entity comprises an enterprise device.

9. A method performed by a system comprising a hardware processor, comprising:
extracting time-series data of an enterprise device from log data, wherein the time-series data of the enterprise device includes measured feature values of a plurality of features over a series of consecutive time periods;
training predictive models for the enterprise device using the time-series data, wherein the training comprises, for each respective feature of the plurality of features:
training a separate predictive model for the respective feature using time-series data specific to the respective feature, wherein the separate predictive model is to output a predicted feature value of the respective feature for a time period;
generating, by the trained predictive models executed in the system, predicted feature values of the plurality of features in response to actual feature values of the enterprise device input to the trained predictive models;
applying first-level deviation criteria to the actual feature values input to the trained predictive models and the predicted feature values output by the trained predictive models to identify deviant features of the plurality of features; and flagging the enterprise device as behaving abnormally based on application of second-level deviation criteria to the identified deviant features.

10. The method of claim 9, wherein the system is a security system, and the method further comprising:
managing, by the security system, the enterprise device that is flagged as behaving abnormally.

11. The method of claim 10, wherein applying the first-level deviation criteria to a first actual feature value and a first predicted feature value of a particular feature comprises:
identifying the particular feature as a deviant feature in response to the first actual feature value exceeding the first predicted feature value by a threshold.

12. The method of claim 11, wherein applying the first-level deviation criteria comprises applying different thresholds to different features to identify deviant features.

13. The method of claim 10, wherein applying the second-level deviation criteria comprises:
identifying the enterprise device as behaving abnormally in response to a threshold number of the plurality of features being identified as deviant features.

14. The method of claim 10, wherein applying the second-level deviation criteria comprises:
identifying the enterprise device as behaving abnormally in response to a predetermined combination of the plurality of features being identified as deviant features.

15. The method of claim 9, further comprising:
providing, as inputs into the trained predictive models to generate the predicted feature values for the plurality of features, actual feature values of the enterprise device from a selected subset of past time periods prior to a given time period for which the predicted feature values are generated.

16. The method of claim 15, wherein the actual feature values from the selected subset of past time periods comprise one or more of:
an actual feature value from a time period immediately prior to the given time period, an actual feature value from one day prior to the given time period, an actual feature value from two days prior to the given time period, an actual feature value from one week prior to the given time period, and an actual feature value from two weeks prior to the given time period.

17. A non-transitory machine-readable medium comprising instructions executable by a processing resource to:
extract time-series data of an enterprise entity from log data, wherein the time-series data of the enterprise entity includes measured feature values of a plurality of features over a series of time periods;
train predictive models specific to the enterprise entity using the time-series data, wherein each predictive model of the predictive models is to generate, for a particular time period, a predicted feature value for a respective feature of the plurality of features;
generate, by the trained predictive models, predicted feature values of the plurality of features in response to actual feature values of the enterprise entity input to the trained predictive models;
apply first-level deviation criteria to the actual feature values input to the trained predictive models and the predicted feature values to identify deviant features of the enterprise entity; and
apply second-level deviation criteria to the identified deviant features to identify the enterprise entity as behaving abnormally.

18. The non-transitory machine-readable medium of claim 17, wherein the instructions are executable by the processing resource to apply the second-level deviation criteria to identify of the enterprise entity as behaving abnormally in response to a threshold number of the plurality of features being identified as deviant features.

19. The non-transitory machine-readable medium of claim 17, wherein the instructions are further executable by the processing resource to provide, as inputs into the predictive model to generate the predicted feature values for the plurality of features, actual feature values of the enterprise entity from a selected subset of past time periods prior to the particular time period.

20. The non-transitory machine-readable medium of claim 19, wherein the actual feature values from the selected subset of past time periods include one or more of:
an actual feature value from a time period immediately prior to the particular time period, an actual feature value from one day prior to the particular time period, an actual feature value from two days prior to the particular time period, an actual feature value from one week prior to the particular time period, and an actual feature value from two weeks prior to the particular time period.

* * * * *